US 6,565,237 B2

(12) United States Patent
Leung

(10) Patent No.: US 6,565,237 B2
(45) Date of Patent: May 20, 2003

(54) VEHICLE LAMP ASSEMBLY

(76) Inventor: Lun Cheung Leung, Flat 5A, Area 6, Wai Man Village, Castle Peak Road, Sham Shui Po, Kowloon (HK)

(*) Notice: Subject to any disclaimer, the term of this patent is extended or adjusted under 35 U.S.C. 154(b) by 0 days.

(21) Appl. No.: 09/909,129

(22) Filed: Jul. 20, 2001

(65) Prior Publication Data

US 2002/0008974 A1 Jan. 24, 2002

(30) Foreign Application Priority Data

Jul. 20, 2000 (HK) ............................................. 00104480

(51) Int. Cl.⁷ .................................................. B60Q 1/04
(52) U.S. Cl. ...................... 362/369; 362/514; 362/372; 362/519; 362/288; 362/369
(58) Field of Search ................................ 362/514, 519, 362/288, 306, 369, 390, 372

(56) References Cited

U.S. PATENT DOCUMENTS 5,067,065 A    11/1991   Dahlgren
5,309,337 A    5/1994    Groben
5,769,525 A    6/1998    Daumueller et al.
5,795,056 A    8/1998    Seiger
6,325,528 B1 * 12/2001   Wittmeier et al. .......... 362/514

FOREIGN PATENT DOCUMENTS

FR    2727290         5/1996
GB    1362135    *    7/1974
SU    1527452 A1      11/1987

* cited by examiner

Primary Examiner—Sandra O'Shea
Assistant Examiner—Anabel Ton
(74) Attorney, Agent, or Firm—Leydig, Voit & Mayer, Ltd.

(57) ABSTRACT

A lamp assembly for a vehicle includes an inner casing, a lamp socket located within the casing for positioning a light bulb, and a pivot support mounted within the casing and supporting the lamp socket. The support includes a hinge member engaging a part of the socket such that the socket is pivotable upwards and downwards about the hinge member. A vibration absorber is connected between the socket and the casing for damping upwards and downwards movement of the socket when a vehicle on which the lamp is mounted moves.

11 Claims, 3 Drawing Sheets

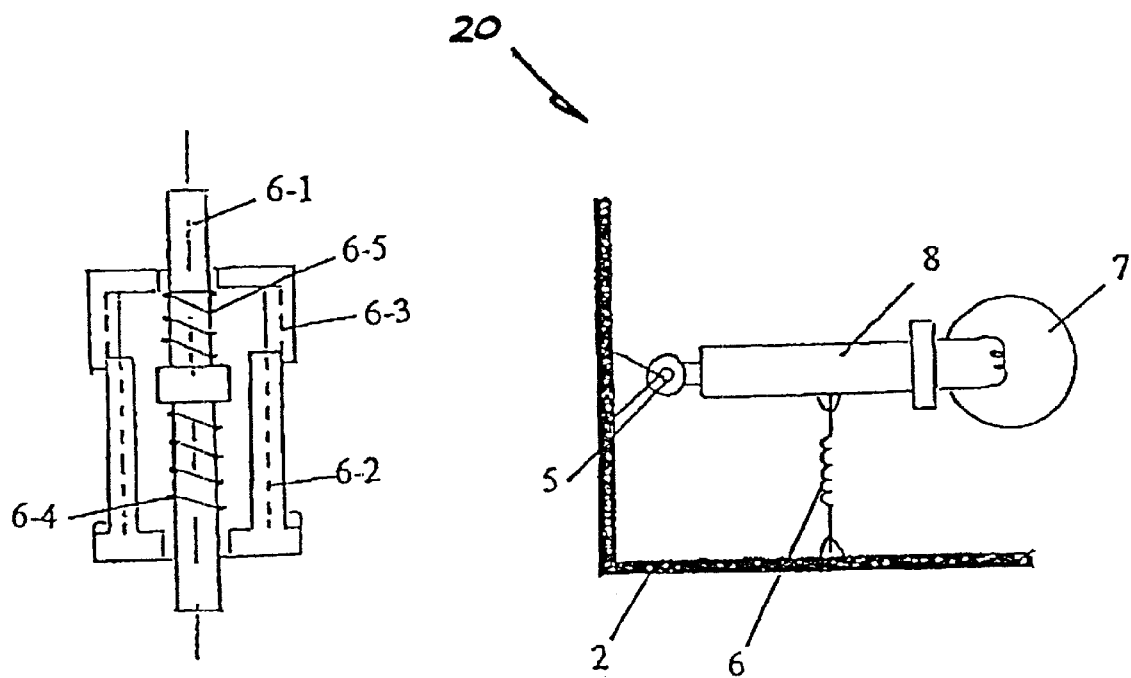
FIG. 5
FIG. 6
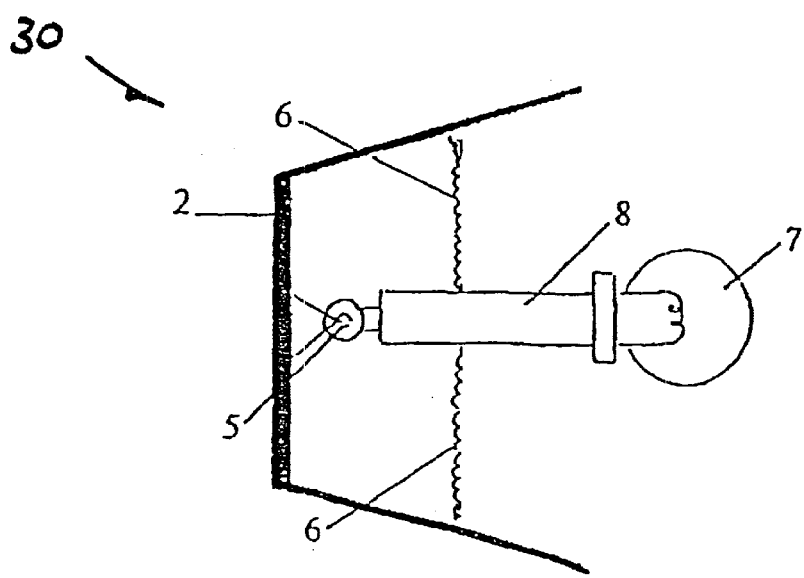
FIG. 7

VEHICLE LAMP ASSEMBLY

The present invention relates to a lamp assembly for use on a motor vehicle.

BACKGROUND OF THE INVENTION

Motor vehicles are subject to vibration during movement, which contributes to shortening of the operating life of the lamps or lights used on the vehicles.

The invention seeks to mitigate or at least alleviate such a problem by providing a vehicle lamp assembly.

SUMMARY OF THE INVENTION

According to the invention, there is provided a lamp assembly for a vehicle, comprising a casing, a lamp socket provided within the casing for locating a light bulb, and a pivot support mounted within the casing and supporting the socket. The support includes a hinge member engaging a part of the socket such that the socket is pivotable upwards and downwards about the hinge member. Vibration absorbing means is connected between the socket and the casing for dampening down upwards and downwards movement of the socket when the vehicle is in movement.

Preferably, the hinge member comprises a substantially horizontal pin.

It is preferred that the vibration absorbing means is operable in opposite directions.

It is further preferred that the vibration absorbing means comprises a coil spring connected between the socket and the casing.

More preferably, the vibration absorbing means includes another coil spring, said two coil springs being connected between the socket and respective opposite parts of the casing.

In a preferred embodiment, the vibration absorbing means comprises a elongate member, at least one coil spring disposed on and in axial engagement with the elongate member, and a side member including opposite parts through which the elongate member passes and between which the at least one coil spring is compressed, the two members being connected to the socket and the casing respectively.

More preferably, the vibration absorbing means includes another coil spring also disposed on the elongate member, the two coil springs being separated by a part of the elongate member and compressed between the opposite parts of the side member.

In a specific construction, the side member comprises a hollow cylinder having opposite end walls acting as the opposite parts.

In a preferred embodiment, the vehicle lamp assembly includes an outer casing receiving the first mentioned casing, said two casings being spaced apart from each other by a spacer that is made of vibration absorbing material.

More preferably, the spacer extends around the inner casing.

Further, more preferably, two spacers are included, which extend around front and rear parts of the inner casing respectively.

It is an advantage that one of the socket part and the hinge member comprises vibration absorbing material for engagement.

BRIEF DESCRIPTION OF DRAWINGS

The invention will now be more particularly described, by way of example only, with reference to the accompanying drawings, in which:

FIG. 5 is a cross-sectional side view of the vibration damper of FIG. 1;

FIG. 6 is a cross-sectional side view of a second embodiment of a vehicle lamp assembly in accordance with the invention; and FIG. 7 is a cross-sectional side view of a third embodiment of a vehicle lamp assembly in accordance with the invention.

DETAILED DESCRIPTION OF PREFERRED EMBODIMENTS

Figure 1:
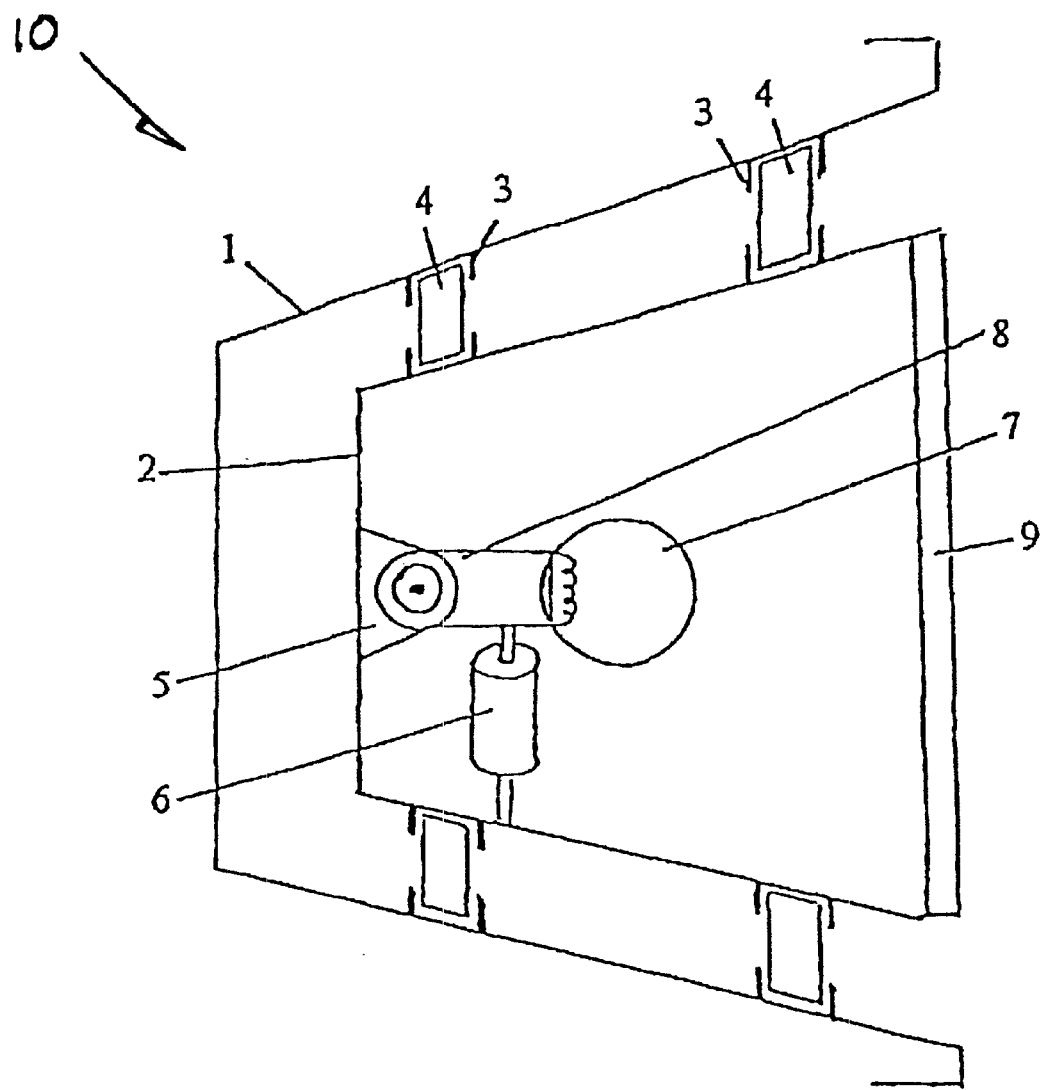
FIG. 1 is a cross-sectional side view of a first embodiment of a vehicle lamp assembly in accordance with the invention, the assembly including outer and inner casings, a lamp unit in the inner casing and a vibration damper for the lamp unit.
Figure 2:
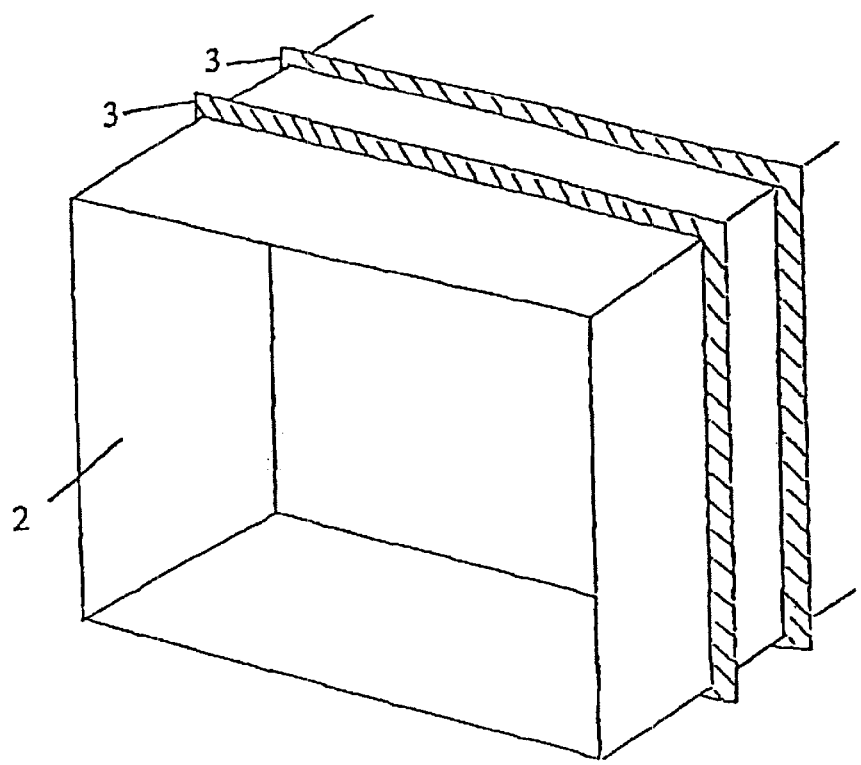
FIG. 2 is a perspective view of the inner casing of FIG. 1.
Figure 3:
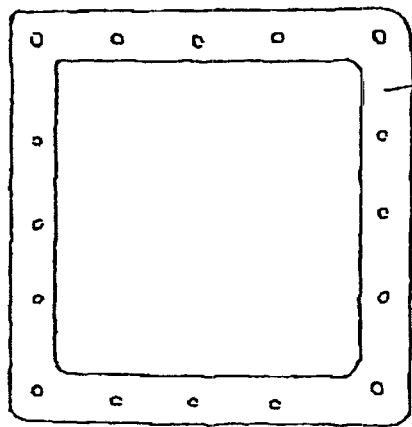
FIG. 3 is a front view of a spacer for use between the outer and the inner casings of FIG. 1.
Figure 4:
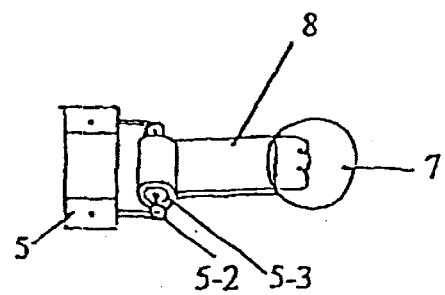
FIG. 4 is a perspective view of the lamp unit of FIG. 1.

Referring initially to FIGS. 1 to 5 of the drawings, there is shown a first vehicle lamp assembly 10 embodying the invention, which assembly 10 comprises a pair of outer and inner trapezoidal cup-shaped casings 1 and 2, a lamp unit 7/8 supported within the inner casing 2, and a vibration absorbing means or vibration damper 6 provided between the inner casing 2 and the lamp unit 7/8. The lamp assembly 10 is intended for use as a headlight, tail-light or spotlight on a motor vehicle, with the outer casing 1 inserted into a suitable recess of the vehicle and fixed in position.

The outer and inner casings 1 and 2 have a rectangular cross-section when viewed from front/rear and a tapered cross-section when viewed from top/bottom or either side, sharing a common horizontal central axis. The larger, front face of the outer casing 1 is open and surrounds the same face of the inner casing 2 that is closed by a detachable lens 9.

The two casings 1 and 2 are spaced apart from each other by means of two rectangular loop-shaped spacers 4, each used between the front or rear parts of the casings 1 and 2 and extending around the inner casing 2. Each spacer 4 is located in position by outer and inner pairs of ribs 3 formed on opposing surfaces of the casings 1 and 2, which together form a frame holding the spacer 4. Both spacers 4 are made of vibration absorbing material, such as rubber, foam or sponge material, for absorbing vibration between the two casings 1 and 2 and in particular minimizing transmission of vibration from the outer casing 1 to the inner casing 2. Vent holes may be formed through the spacers 4 for heat dissipation.

The lamp unit 7/8 comprises a light bulb 7 and a lamp socket 8 for locating the light bulb 7. The lamp socket 8 is mounted centrally on the base (rear wall) of the inner casing 2 by means of a pivot support 5, with the light bulb 7 pointing generally horizontally forwards. The pivot support 5 includes a horizontal hinge pin 5-2 which passes through a horizontal tube 5-3 at the rear end of the lamp socket 8, such that the lamp unit 7/8 is pivotable upwards and downwards about the hinge pin 5-2 relative to the inner casing 2. The hinge pin 5-2 and/or the socket end tube 5-3 comprises vibration absorbing material, such as rubber, foam or plastics material, for engagement to absorb or reduce vibration transmitted to the lamp socket 8 or light bulb 7.

The vibration damper 6 comprises a vertical hollow cylinder including upper and lower cans 6-3 and 6-2, a central shaft 6-1 passing vertically through respective apertured end walls of the cans 6-3 and 6-2, and upper and lower coil springs 6-5 and 6-4 disposed on the shaft 6-1. The two cans 6-3 and 6-2 include internal and external screw threads for adjustable inter-connection. The shaft 6-1 includes an enlarged portion at about its mid-length, which separates the two springs 6-5 and 6-4 and with which the two springs 6-5 and 6-4 engage in opposite axial directions. The springs 6-5 and 6-4 are compressed between the enlarged portion and opposite end walls of the corresponding cans 6-3 and 6-2 and co-act to maintain the shaft 6-1 and the cylinder at an equilibrium position relative to each other.

The vibration damper 6 is used directly below and supports the lamp unit 7/8, with the shaft 6-1 connected at its upper end to the lamp socket 8 and the cylinder connected at the bottom end of its lower can 6-2 to the inner casing 2. At the equilibrium condition of the vibration damper 6, the light bulb 7 points in a horizontal direction. The vibration damper 6 co-acts between the lamp unit 7/8 and the inner casing 2 in a substantially vertical direction and serves to absorb vibration of the lamp unit 7/8 relative to the inner casing 2 in either upward or downward direction. The stiffness of the vibration damper 6 may be adjusted by screwing the cans 6-3 and 6-2 closer together or farther apart to alter the force of the springs 6-5 and 6-4.

FIG. 6 shows a second vehicle lamp assembly 20 embodying the invention, which assembly 20 has substantially the same basic construction as the first assembly 10, with equivalent parts designated by the same reference numerals. The only major difference lies in the construction of the vibration damper, which in the present case is implemented by a single vertical coil spring 6.

The spring 6 acts as both a compression and a tension spring in opposite directions and supports the lamp unit 7/8 from below, with its upper end connected to the lamp socket 8 and its lower end connected to the inner casing 2. At the equilibrium condition of the spring 6, the light bulb 7 points horizontally forwards. In operation, the spring 6 is compressed to slow down, resist or counteract downward movement of the lamp unit 7/8 or extended to counteract its upward movement.

FIG. 7 shows a third vehicle lamp assembly 30 embodying the invention, which assembly 30 has substantially the same basic construction as the first assembly 10, with equivalent parts designated by the same reference numerals. The only major difference lies in the construction of the vibration damper, which in this case is implemented by a pair of upper and lower vertical coil springs 6.

Both of the springs 6 act as tension springs, and support the lamp unit 7/8 from above and below by stretching across the lamp socket 8 and the upper and lower walls of the inner casing 2 respectively. At the equilibrium condition of the springs 6, the light bulb 7 points horizontally forwards. In operation, the upper spring 6 is extended to counteract downward movement of the lamp unit 7/8 or the lower spring 6 is extended to counteract its upward movement.

The lamp assembly of the subject invention is resistant to damage that may otherwise be caused by vibration of motor vehicles. The improvement is achieved by the use of the vibration absorbing means 6 between the lamp socket 8 and the casing 2. The improvement may be enhanced by using vibration absorbing spacers 4 between the outer and inner casings 1 and 2 and/or vibration absorbing material between the socket end tube 5-3 and the hinge pin 5-2.

The invention has been given by way of example only, and various other modifications of and/or alterations to the described embodiments may be made by persons skilled in the art without departing from the scope of the invention as specified in the appended claims.

What is claimed is

1. A lamp assembly for a vehicle, comprising an inner casing, a lamp socket located within the inner casing for positioning a light bulb, a pivot support mounted within the inner casing and supporting the lamp socket, the pivot support including a hinge member engaging a part of the lamp socket so that the lamp socket is pivotable in two opposite directions about the hinge member, vibration absorbing means connected between the lamp socket and the inner casing for damping movement of the lamp socket in the two opposite directions when a vehicle on which the lamp assembly is mounted is moving, a vibration absorbing spacer, and an outer casing receiving the inner casing, the inner casing and the outer casing being spaced apart from each other by the vibration absorbing spacer.

2. The vehicle lamp assembly as claimed in claim 1, wherein the hinge member comprises a substantially horizontal pin.

3. The vehicle lamp assembly as claimed in claim 1, wherein the vibration absorbing means moves in two opposite directions.

4. The vehicle lamp assembly as claimed in claim 3, wherein the vibration absorbing means comprises a first coil spring connected between the lamp socket and the inner casing.

5. The vehicle lamp assembly as claimed in claim 4, wherein the vibration absorbing means includes a second coil spring, the first and second coil springs being connected between the lamp socket and respective opposite parts of the inner casing.

6. The vehicle lamp assembly as claimed in claim 3, wherein the vibration absorbing means comprises a elongate member, a first coil spring disposed on and in axial engagement with the elongate member, and a side member including opposite parts through which the elongate member passes and between which the first coil spring is compressed, the elongate and side members being connected to the lamp socket and the inner casing, respectively.

7. The vehicle lamp assembly as claimed in claim 6, wherein the vibration absorbing means includes a second coil spring disposed on the elongate member, the first and second coil springs being separated by a part of the elongate member and compressed between the opposite parts of the side member.

8. The vehicle lamp assembly as claimed in claim 6, wherein the side member comprises a hollow cylinder having opposite end walls as the opposite parts.

9. The vehicle lamp assembly as claimed in claim 1, wherein the spacer extends around the inner casing.

10. The vehicle lamp assembly as claimed in claim 9, including two of the spacers, the spacers extending around front and rear parts of the inner casing, respectively.

11. The vehicle lamp assembly as claimed in claim 1, wherein one of the parts of the lamp socket and the hinge member comprises a vibration absorbing material.

* * * * *